United States Patent
Chao et al.

(10) Patent No.: US 8,326,034 B2
(45) Date of Patent: Dec. 4, 2012

(54) METHOD OF REDUCING THE AMOUNT OF BLACK IN AN IMAGE

(75) Inventors: Kuan-Li Chao, Taipei (TW); Kuo-Ping Yang, Taipei (TW); Neo Bob Chih Yung Young, Taipei (TW)

(73) Assignee: Kuo-Ping Yang, Taipei (TW)

( * ) Notice: Subject to any disclaimer, the term of this patent is extended or adjusted under 35 U.S.C. 154(b) by 351 days.

(21) Appl. No.: 12/805,542

(22) Filed: Aug. 5, 2010

(65) Prior Publication Data

US 2012/0033882 A1    Feb. 9, 2012

(51) Int. Cl.
  *G06K 9/00*   (2006.01)
  *G06F 15/00*  (2006.01)
  *H04N 1/60*   (2006.01)

(52) U.S. Cl. .......................... 382/167; 382/162; 358/1.9

(58) Field of Classification Search ........................ None
See application file for complete search history.

(56) References Cited

U.S. PATENT DOCUMENTS

| | | | | |
|---|---|---|---|---|
| 4,590,515 A * | 5/1986 | Wellendorf | | 358/500 |
| 7,036,907 B2 * | 5/2006 | Jung et al. | | 347/43 |
| 7,672,022 B1 * | 3/2010 | Fan | | 358/474 |
| 2011/0205562 A1 * | 8/2011 | Chao et al. | | 358/1.9 |

* cited by examiner

*Primary Examiner* — Li Liu
(74) *Attorney, Agent, or Firm* — Bacon & Thomas, PLLC

(57) ABSTRACT

A method to reduce the amount of black in an image is disclosed. The method uses a computer to reduce or eliminate the amount of black in an original digital image. In the present invention, every three adjacent pixels are processed as a set, and the intensities of the RGB values are increased, respectively.

4 Claims, 5 Drawing Sheets

METHOD OF REDUCING THE AMOUNT OF BLACK IN AN IMAGE

BACKGROUND OF THE INVENTION

1. Field of the Invention

The present invention relates to a method of reducing the amount of black in an image, such that a printer can print the image without or with only a little black ink (or toner).

2. Description of the Related Art

Generally, a common printer performs an automatic determination of an image for being printed according to a print command sent from a user end computer, after which it accordingly mixes in black ink (or toner) to achieve a grayscale effect, thereby saving the consumption of color ink (or toner) as well as achieving a better shadow detail effect. However, for certain situations, an image printed with black ink (or toner) is not desired. For example, when a user utilizes an optical pen (also known as an optical index/optical identification (OID) pen, please refer to http://www.giga.com.tw/english/productpen.htm for more details) to read a speech-purpose print code (mostly in the form of very tiny 2D barcodes) on a certain image, the efficiency of the OID pen may be affected if the image itself also contains a lot of black, since the speech-purpose print code is printed completely or primarily in black.

In known prior art solutions, image processing software is utilized to convert the image from an RGB format into a CMYK format and to eliminate or reduce the K value in the CMYK format. However, one RGB value may correspond to multiple CMYK combinations. Therefore, when the converted image is sent to a printer end, the printer system will still process the remaining CMY values and add a K value to obtain a shadow effect. Moreover, the printed image may look unbalanced because the K value (i.e. the shadow) of the original image is eliminated, while the brighter part remains unchanged.

Therefore, there is a need to provide a method of reducing the amount of black so as to completely avoid the conversion mechanism of adding the K value performed by the printer system, such that the user can obtain a printed image without or with only a little black ink (or toner), thereby mitigating and/or obviating the aforementioned problems.

In order to solve the abovementioned problems, the applicant filed the prior Taiwan Patent Application No. 098139978. However, the major procedure of the prior patent application is to increase the number of pixels by four or nine times, which may result in a poor resolution and a more time-consuming calculation. The present invention can further improve the efficiency of the prior patent application.

SUMMARY OF THE INVENTION

It is an object of the present invention to provide a method of reducing the amount of black in an image.

To achieve the abovementioned object, the method of reducing the amount of black in an image of the present invention comprises the following steps:

(A) Reading an original digital image, which comprises P original pixels, wherein $3 \leq P \leq 9{,}000{,}000{,}000$, and each original pixel comprises three types of color information including the following: R color information referring to a red value; G color information referring to a green value; and B color information referring to a blue value, where:

$0 \leq R \leq F$, $0 \leq G \leq F$, $0 \leq B \leq F$, wherein $2^4 - 1 \leq F \leq 2^{32} - 1$; and (B) converting each of the P original pixels into each of corresponding P converted pixels, wherein each converted pixel comprises three types of color information including the following: R' color information referring to a red value, G' color information referring to a green value, and B' color information referring to a blue value, where:

$0 \leq R' \leq F, 0 \leq G' \leq F, 0 \leq B' \leq F$;

wherein the P converted pixels are characterized in that:

the P converted pixels include N sets of converted pixels, where N is an integer and $1 \leq N \leq P/3$, and each set of converted pixels comprises three adjacent converted pixels, wherein the three adjacent converted pixels are respectively characterized in that:

Characteristic R1: one of the converted pixels is obtained by means of increasing the intensity of the R value of its corresponding original pixel, such that the R' value of the converted pixel is greater than or equal to the R value of its corresponding original pixel, wherein:

$0.8 \times F \leq R' \leq F$, and preferably $R' = F$ according to one embodiment of the present invention;

Characteristic G1: one of the converted pixels is obtained by means of increasing the intensity of the G value of its corresponding original pixel, such that the G' value of the converted pixel is greater than or equal to the G value of its corresponding original pixel, wherein:

$0.8 \times F \leq G' \leq F$, and preferably $G' = F$ according to one embodiment of the present invention;

and

Characteristic B1: one of the converted pixels is obtained by means of increasing the intensity of the B value of its corresponding original pixel, such that the B' value of the converted pixel is greater than or equal to the B value of its corresponding original pixel, wherein:

$0.8 \times F \leq B' \leq F$, and preferably $B' = F$ according to one embodiment of the present invention.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
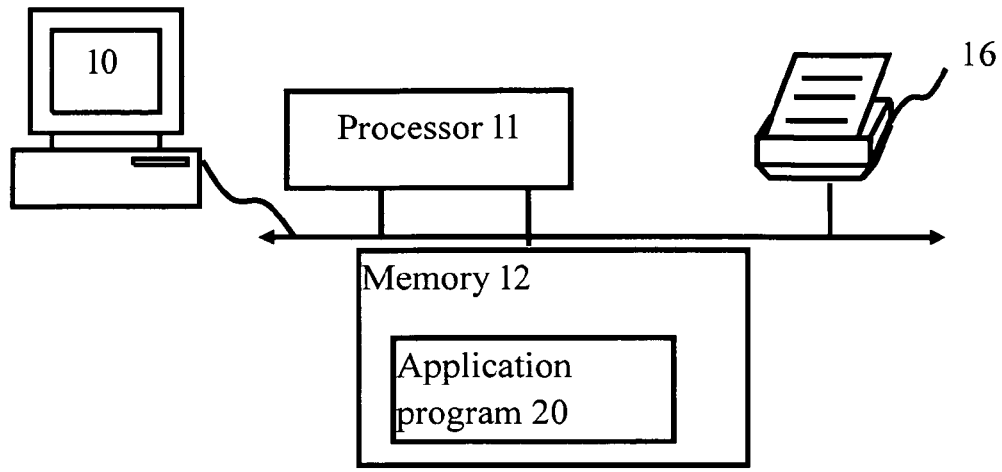
FIG. 1 illustrates an environmental schematic drawing according to a first embodiment of the present invention.

Please refer to FIG. 1, which illustrates an environmental schematic drawing according to a first embodiment of the present invention.

A user can utilize a personal computer 10 to execute the method of reducing the amount of black in an image of the present invention. The computer mainly comprises a processor 11 and a memory 12. The memory 12 is stored with an application program 20. In the present invention, the processor 11 executes the application program 20 so as to generate and perform the steps of the present invention.

The computer 10 is connected to a printer 16 via either a wired connection or a wireless connection. The printer 16 is used for printing documents.

Figure 2:
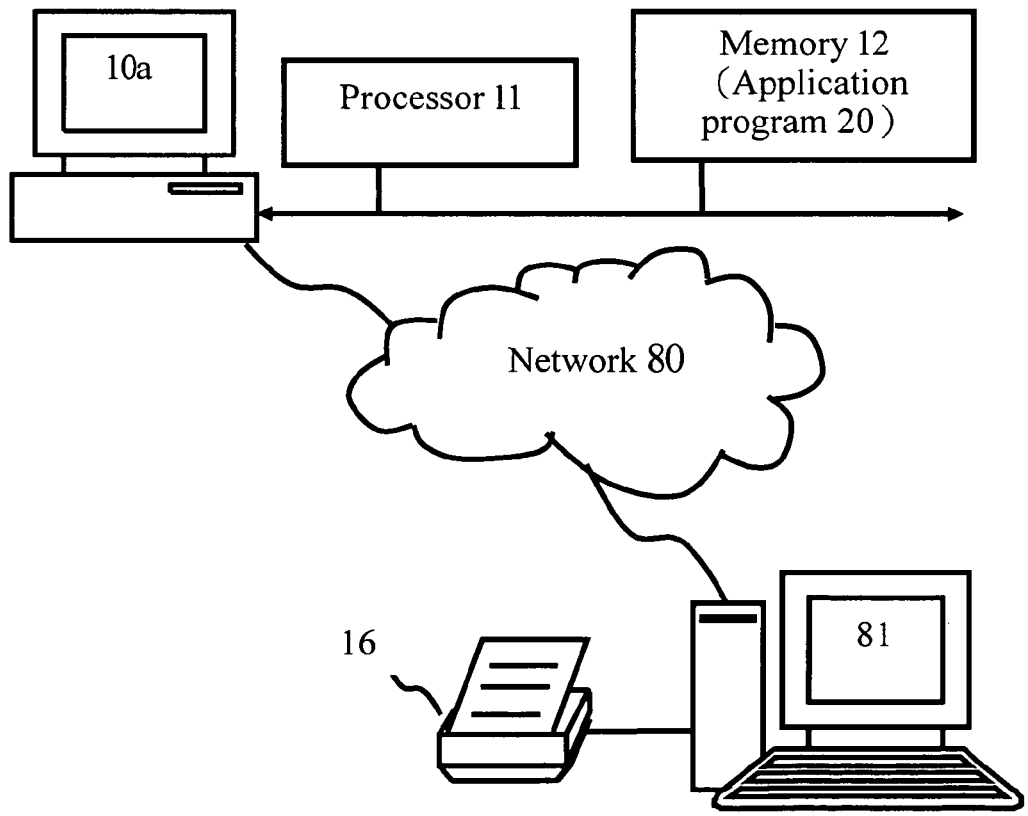
FIG. 2 illustrates an environmental schematic drawing according to a second embodiment of the present invention.

FIG. 2 illustrates an environmental schematic drawing, according to a second embodiment of the present invention. The user utilizes a near-end computer 81 to connect to a computer 10a (such as a network server) via a network 80 (such as the internet), such that the near-end computer 81 can use the application program 20 of the network server 10a. In the second embodiment, the printer 16 is connected to the near-end computer 81 via either a wired connection or a wireless connection. The point of these two different embodiments is that the user can utilize the computer to execute the application program 20 and then utilize the printer 16 to print documents.

Figure 3:
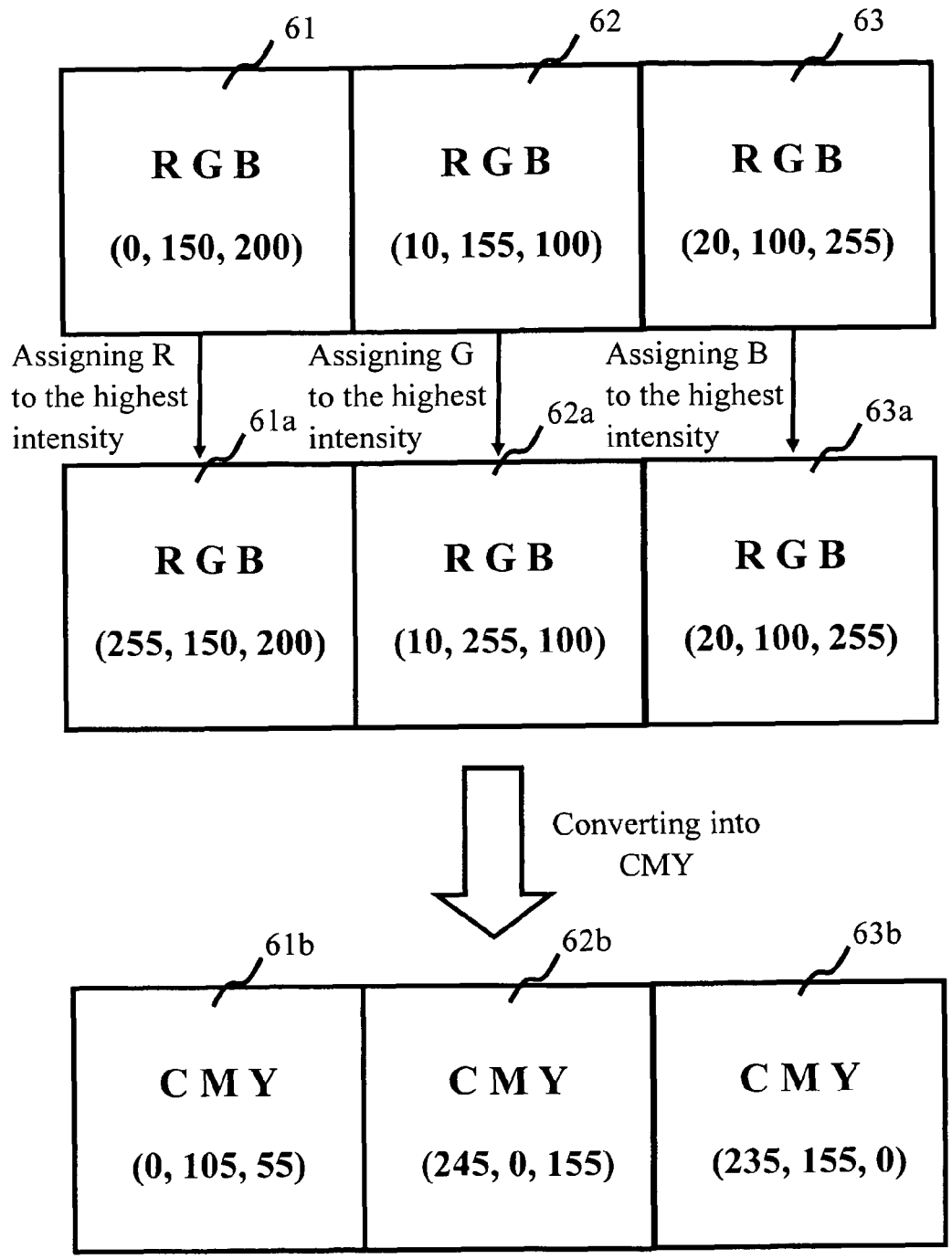
FIG. 3 illustrates a schematic drawing showing the techniques and steps of reducing the amount of black in an image according to the present invention.

Please refer to FIG. 3, which illustrates a schematic drawing showing the techniques and steps of reducing the amount of black in an image according to the present invention. Basically, every three adjacent pixels are processed as a set in the present invention. Take three adjacent pixels 61, 62, and 63 as an example. The RGB color information of the three pixels is as follows (wherein R refers to a red value, G refers to a green value, B refers to a blue value, and 255 is the highest intensity):

Pixel 61 (RGB)=(0, 150, 200);
Pixel 62 (RGB)=(10, 155, 100); and
Pixel 63 (RGB)=(20, 150, 255).

The present invention respectively performs the following processes to the three pixels: "increasing the intensity of the R value of one pixel", "increasing the intensity of the G value of one pixel" and "increasing the intensity of the B value of one pixel". In this embodiment, the R, G, or B value is directly increased to its highest intensity (such as 255). Afterwards, the RGB color information of the three adjacent pixels 61a, 62a, and 63a is as follows:

Pixel 61a (RGB)=(255, 150, 200);
Pixel 62a (RGB)=(10, 255, 100); and
Pixel 63a (RGB)=(20, 150, 255).

Please note that the present invention only increases the intensity of one type of color information of each pixel. For example, the present invention only increases the intensity of the R value of the pixel 61 without increasing the intensity of its G or B value. Further, the present invention increases the intensity of different types of color information of the three adjacent pixels.

Please also note that because the original B value of the pixel 63 is already at the highest intensity (i.e. 255), there is no way for the intensity of the B value of the pixel 63a to be increased. Therefore, the RGB color information of the pixel 63a is identical to that of the pixel 63. As a result, in the present invention, with regard to increasing the intensity of the color information, there would be no need to increase the intensity if the color information is at the highest intensity.

No matter whether the above pixels 61, 62, and 63, or pixels 61a, 62a, and 63a, are recorded in the format of general files with their RGB values, or displayed on the near-end computer 81 with their color information, as shown in FIG. 2, when the pixels are going to be printed out by the printer 16 (or other printing equipment), the printing system (or the computer) will convert the RGB value into a CMY system for the printing process. In fact, CMY colors are complementary colors of RGB colors. Please continue to refer to FIG. 3; the CMY color information of printing pixels 61b, 62b, and 63b is as follows:

Pixel 61b (CMY)=(0, 105, 55);
Pixel 62b (CMY)=(245, 0, 155); and
Pixel 63b (CMY)=(235, 105, 0).

The CMY value is obtained by means of subtracting the RGB value from the "highest intensity" (such as 255). Because the pixels 61a, 62a, and 63a respectively have at least one color value (R, G or B) at the highest intensity (255), the pixels 61b, 62b and 63b will respectively have at least one CMY value at "0". Therefore, when the pixels 61b, 62b and 63b are being printed, no black ink will be printed out.

Figure 4:
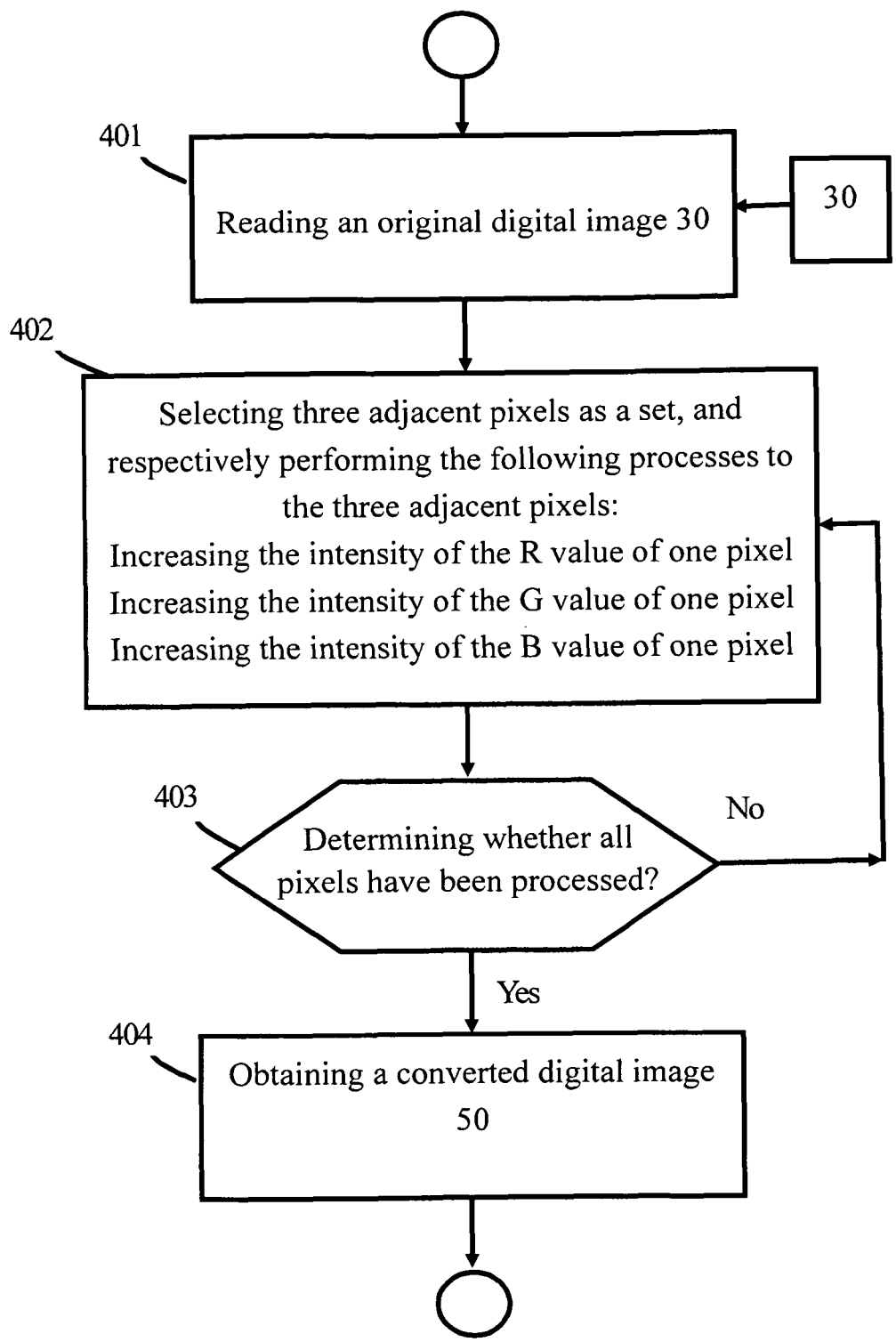
FIG. 4 illustrates a flowchart according to the present invention.
Figure 5:
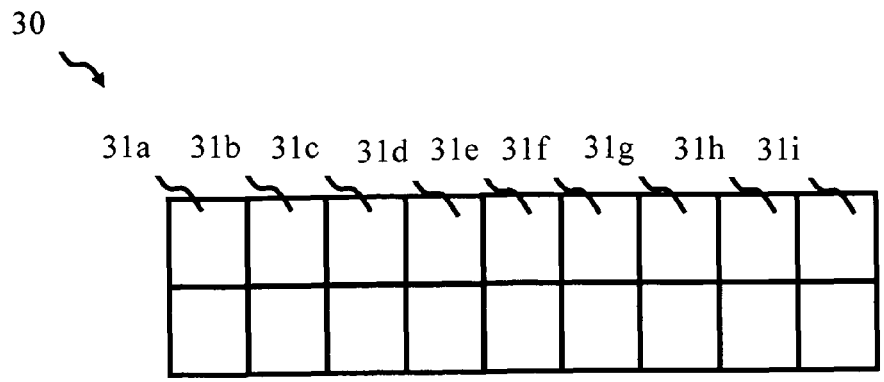
FIG. 5 illustrates a schematic drawing showing original pixels of an original digital image.

In order to further understand the present invention, please refer to FIG. 4, which illustrates a flowchart according to the present invention. Please also refer to FIGS. 1~2 and FIGS. 5~7 for a more detailed description.

Step 401: Reading an original digital image 30.

The original digital image 30 comprises P original pixels, wherein $3 \leq P \leq 9,000,000,000$. A pixel is the minimum unit of a digital image (bitmap). For example, an 800×600 image is 800 pixels in width and 600 pixels in height. Therefore, an 800×600 digital image has a total of 800×600=480,000 pixels. Theoretically, P can be infinity; however, for current and foreseeable applications, it should be sufficient that P has a maximum of 9,000,000,000 to cover the usage of most digital images.

For example, the user can obtain a digital image from his/her computer or from a website for the application program 20 to read. Please note that the digital image may not be recorded in a bitmap format (e.g., it may be recorded in a compressed JPG format). If that is the case, the digital image needs to be converted into the bitmap format first. In step 401, the original digital image 30 can be a pre-processed digital image, such as an image converted from other formats, a reduced image, or an enlarged image.

Each of the original pixels 31a, 31b, 31c, 31d, 31e, 31f, 31g, 31h, and 31i (as shown in the first row of FIG. 5) comprises the values of RGB color information. Generally, color information is represented in 8-bit, wherein the minimum value of each type of color information is 0, and the maximum value is 255. Currently, 4-bit representation, 8-bit representation, and 16-bit representation are commonly used, and it is possible that 32-bit representation will become popular in the further; therefore:

$0 \leq R \leq F$, $0 \leq G \leq F$, $0 \leq B \leq F$, wherein $2^4-1 \leq F \leq 2^{32}-1$.

Step 402: Selecting three adjacent pixels as a set, and respectively: increasing the intensity of the R value of one pixel, increasing the intensity of the G value of one pixel, and increasing the intensity of the B value of one pixel.

Figure 6:
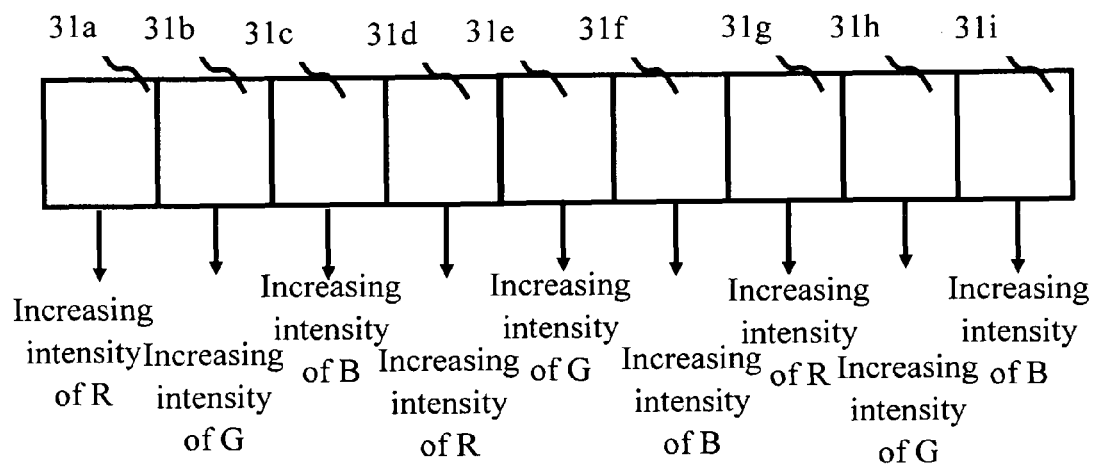
FIG. 6 illustrates a schematic drawing of a converted digital image according to one embodiment of the present invention.
Figure 7:
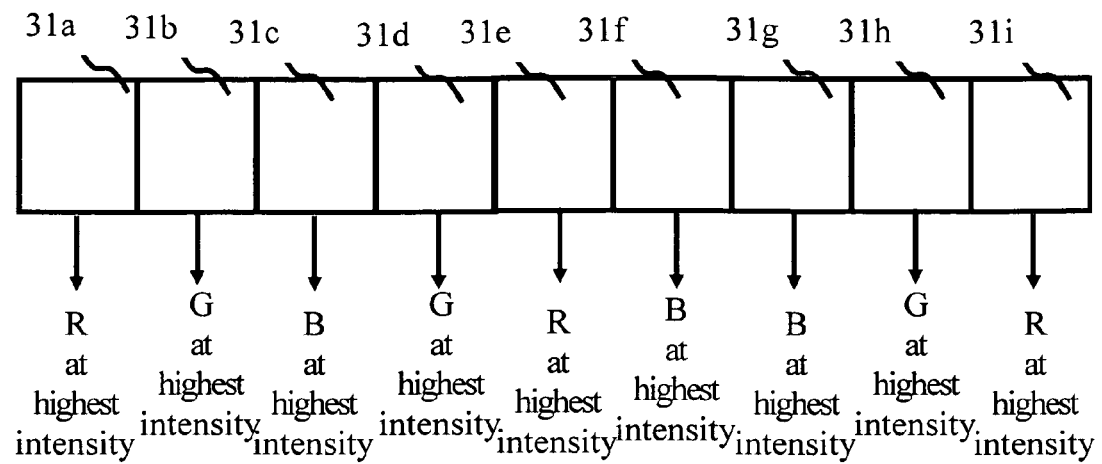
FIG. 7 illustrates a schematic drawing of a converted digital image according to another embodiment of the present invention.

Step 402 corresponds to the techniques and steps as shown in FIG. 3. Take the first row of FIG. 5 as an example; every three of the original pixels 31a~31i are treated as a set to perform the process of increasing the intensity of the R value, the G value, and the B value. As shown in FIG. 6:

With regard to the first three adjacent original pixels:
Original pixel 31a: increasing the intensity of the R value;

Original pixel 31b: increasing the intensity of the G value; and

Original pixel 31c: increasing the intensity of the B value.

Next, with regard to the next set of three adjacent original pixels:

Original pixel 31d: increasing the intensity of the R value;

Original pixel 31e: increasing the intensity of the G value; and

Original pixel 31f: increasing the intensity of the B value.

Then, with regard to the next set of three adjacent original pixels:

Original pixel 31g: increasing the intensity of the R value;

Original pixel 31h: increasing the intensity of the G value; and

Original pixel 31i: increasing the intensity of the B value.

Please note that the R' value, the G' value, and the B' value (wherein R' refers to a red value, G' refers to a green value, and B' refers to a blue value) of any converted pixel after the performance of the process of increasing the intensity still range from 0 to the highest intensity, which means:

$0 \leq R' \leq F$, $0 \leq G' \leq F$, $0 \leq B' \leq F$.

After processing three adjacent original pixels of each time, the method determines whether all pixels have been processed (step 403). If not, the method repeats step 402 until all original pixels have been through the process of increasing the intensity. Finally, a converted digital image 50 can be obtained (step 404).

Because the present invention performs the process of increasing the intensity to every three adjacent pixels, if there are P pixels, there would be at most "P/3" sets of three adjacent pixels. If there are N sets of three adjacent pixels, the relation between N and P can be represented as follows:

N is an integer and $1 \leq N \leq P/3$.

After step 402, the following conclusions can be obtained according to the above embodiments (including the description of FIG. 3):

The number of pixels (i.e., P converted pixels) of the converted digital image 50 remains the same as the number of pixels (i.e., P original pixels) of the original digital image 30.

P converted pixels include N sets of converted pixels, wherein N is an integer and $1 \leq N \leq P/3$, and each set of converted pixels comprises three adjacent converted pixels, where the three adjacent converted pixels are respectively characterized in that:

Characteristic R1:

One of the converted pixels is obtained by means of increasing the intensity of the R value of its corresponding original pixel, such that the R' value of the converted pixel is greater than or equal to the R value of its corresponding original pixel, wherein:

$0.8 \times F \leq R' \leq F$;

the G' value of the converted pixel and the G value of its corresponding original pixel are in the relation of:

$0.9G \leq G \leq G' \leq 1.1G \leq F$;

and the B' value of the converted pixel and the B value of its corresponding original pixel are in the relation of:

$0.9B \leq B' \leq 1.1B \leq F$.

Take a pixel (RGB)=(0, 150, 200) as an example:

After the method increases the intensity of the R value, and keeps the G and B values closer, the following converted pixel is obtained:

Pixel (R'G'B')=(204~255, 135~165, 180~220).

The R' value is at least closer to the highest intensity F (such as 255) and at least greater than the R value because the C value used for printing converted from the R' value will be very small, which means the amount of black will be very low. Therefore, the R' value is preferably at the highest intensity F, so as to ensure there is no amount of black.

The G' and B' values need to be as close to the G and B values as possible to maintain the original color. Therefore, preferably G'=G and B'=B.

Characteristic G1:

One of the converted pixels is obtained by means of increasing the intensity of the G value of its corresponding original pixel, such that the G' value of the converted pixel is greater than or equal to the G value of its corresponding original pixel, wherein:

$0.8 \times F \leq G' \leq F$;

the B' value of the converted pixel and the B value of its corresponding original pixel are in the relation of:

$0.9B \leq B' \leq 1.1B \leq F$;

and the R' value of the converted pixel and the R value of its corresponding original pixel are in the relation of:

$0.9R \leq R' \leq 1.1R \leq F$.

Take a pixel (RGB)=(0, 150, 200) as an example:

After the method increases the intensity of the G value, and keeps the B and R values closer, the following converted pixel is obtained:

Pixel (R'G'B')=(0, 204~255, 180~220).

The G' value is at least closer to the highest intensity F (such as 255) and at least greater than the G value because the M value used for printing converted from the G' value would be very small, which means the amount of black would be very low. Therefore, the G' value is preferably at the highest intensity F, so as to ensure there is no amount of black.

The B' and R' values need to be as close to the B and R values as possible to maintain the original color. Therefore, preferably B'=B and R'=R.

Characteristic B1:

One of the converted pixels is obtained by means of increasing the intensity of the B value of its corresponding original pixel, such that the B' value of the converted pixel is greater than or equal to the B value of its corresponding original pixel, wherein:

$0.8 \times F \leq B' \leq F$;

the R' value of the converted pixel and the R value of its corresponding original pixel are in the relation of:

$0.9R \leq R' \leq 1.1R \leq F$;

and the G' value of the converted pixel and the G value of its corresponding original pixel are in the relation of:

$0.9G \leq G' \leq 1.1G \leq F$.

Take a pixel (RGB)=(0, 150, 200) as an example:

After the method increases the intensity of the B value, and keeps the R and G values closer, the following converted pixel is obtained:

Pixel (R'G'B')=(0, 135~165, 204~255).

The B' value is at least closer to the highest intensity F (such as 255) and at least greater than the B value because the Y value used for printing converted from the B' value will be very small, which means the amount of black will be very low. Therefore, the B' value is preferably at the highest intensity F, so as to ensure there is no amount of black.

The R' and G' values need to be as close to the R and G values as possible to keep its original color. Therefore, preferably R'=R and G'=G.

In FIG. 6, the method increases the intensities of the R value, the G value, and the B value of each of the original pixels 31a~31i in a sequential way. In addition to the "RGB" sequence, the present invention can also adopt other sequences, such as GBR, GRB, RBG, BRG or BGR. Further, according to a practical experiment, a good performance can also be obtained even if the method does not increase the intensity in a fixed sequential way as long as the intensities of the R value, the G value, and the B value are respectively increased in three adjacent original pixels. For example, please refer to FIG. 7; the method respectively increases the intensity of the original pixels 31a~31c in an "RGB" sequence, then respectively increases the intensity of the next set of three original pixels 31d~31f in a "GRB" sequence rather than the "RGB" sequence, and respectively increases the intensity of the next set of three original pixels 31g~31i in a "BGR" sequence also rather than the "RGB" sequence.

Figure 8:
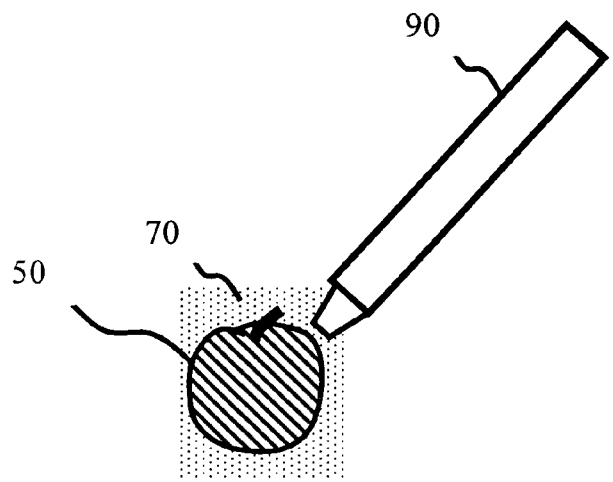
FIG. 8 illustrates a schematic drawing showing an OID pen reading a speech-purpose print code.

According to the abovementioned steps, after the black of the original digital image 30 has been eliminated or reduced in amount to obtain the converted digital image 50, its print-out can, for example, be read by an optical pen 90. The optical pen 90 is also known as an optical index/optical identification (OID) pen (please refer to http://www.giga.com.tw/english/productpen.htm for more details). Because the hardware is a known device, there is no need for further description. Please refer to FIG. 8. A speech-purpose print code 70 and the converted digital image 50 are printed on the same location. Although the speech-purpose print code 70 is still printed in black, the efficiency of utilizing the optical pen 90 to read the speech-purpose print code 70 can be significantly increased because the black of the converted digital image 50 has been eliminated or reduced in amount.

Although the present invention has been explained in relation to its preferred embodiments, it is to be understood that many other possible modifications and variations can be made without departing from the spirit and scope of the invention as hereinafter claimed.

What is claimed is:

1. A method of reducing an amount of black in an image, utilizing a computer to reduce or eliminate the amount of black in an original digital image, so as to obtain a converted digital image, the method comprising the following steps:
   (A) reading the original digital image, which comprises P original pixels, wherein $3 \leq P \leq 9,000,000,000$, and each original pixel comprises three types of color information including the following: R color information referring to a red value, G color information referring to a green value, and B color information referring to a blue value, where:
   $0 \leq R \leq F$, $0 \leq G \leq F$, $0 \leq B \leq F$, wherein $2^4 - 1 \leq F \leq 2^{32} - 1$; and
   (B) converting each of the P original pixels into each of the corresponding P converted pixels, wherein each converted pixel comprises three types of color information consisting of the following: R' color information referring to a red value, G' color information referring to a green value, and B' color information referring to a blue value, where:
   $0 \leq R' \leq F$, $0 \leq G' \leq F$, $0 B' \leq F$;
   wherein the P converted pixels are characterized in that:
   the P converted pixels include N sets of converted pixels, where N is an integer and $1 \leq N \leq P/3$, and each set of converted pixels comprises three adjacent converted pixels, wherein the three adjacent converted pixels are respectively characterized in that:
   Characteristic R1: one of the converted pixels is obtained by means of increasing the intensity of the R value of its corresponding original pixel, such that the R' value of the converted pixel is greater than or equal to the R value of its corresponding original pixel, wherein:
   $0.8 \times F \leq R' \leq F$;
   Characteristic G1: one of the converted pixels is obtained by means of increasing the intensity of the G value of its corresponding original pixel, such that the G' value of the converted pixel is greater than or equal to the G value of its corresponding original pixel, wherein:
   $0.8 \times F \leq G' \leq F$;
   and
   Characteristic B1: one of the converted pixels is obtained by means of increasing the intensity of the B value of its corresponding original pixel, such that the B' value of the converted pixel is greater than or equal to the B value of its corresponding original pixel, wherein:
   $0.8 \times F \leq B' \leq F$.

2. The method of reducing the amount of black in an image as claimed in claim 1, wherein:
   Characteristic R1 further includes that:
   the G' value of the converted pixel and the G value of its corresponding original pixel are in the relation of:
   $0.9G \leq G' \leq 1.1G \leq F$; and
   the B' value of the converted pixel and the B value of its corresponding original pixel are in the relation of:
   $0.9B \leq B' \leq 1.1B \leq F$;
   Characteristic G1 further includes that:
   the B' value of the converted pixel and the B value of its corresponding original pixel are in the relation of:
   $0.9B \leq B' \leq 1.1B \leq F$; and
   the R' value of the converted pixel and the R value of its corresponding original pixel are in the relation of:
   $0.9R \leq R' \leq 1.1R \leq F$;
   and
   Characteristic B1 further includes that:
   the R' value of the converted pixel and the R value of its corresponding original pixel are in the relation of:
   $0.9R \leq R' \leq 1.1R \leq F$; and
   the G' value of the converted pixel and the G value of its corresponding original pixel are in the relation of:
   $0.9G \leq G' \leq 1.1G \leq F$.

3. The method of reducing the amount of black in an image as claimed in claim 2, wherein:
   R'=F in Characteristic R1;
   G'=F in Characteristic G1; and
   B'=F in Characteristic B1.

4. The method of reducing the amount of black in an image as claimed in claim 3, wherein:
   G'=G and B'=B in Characteristic R1;
   B'=B and R'=R in Characteristic G1; and
   R'=R and G'=G in Characteristic B1.

* * * * *